Figure 1:
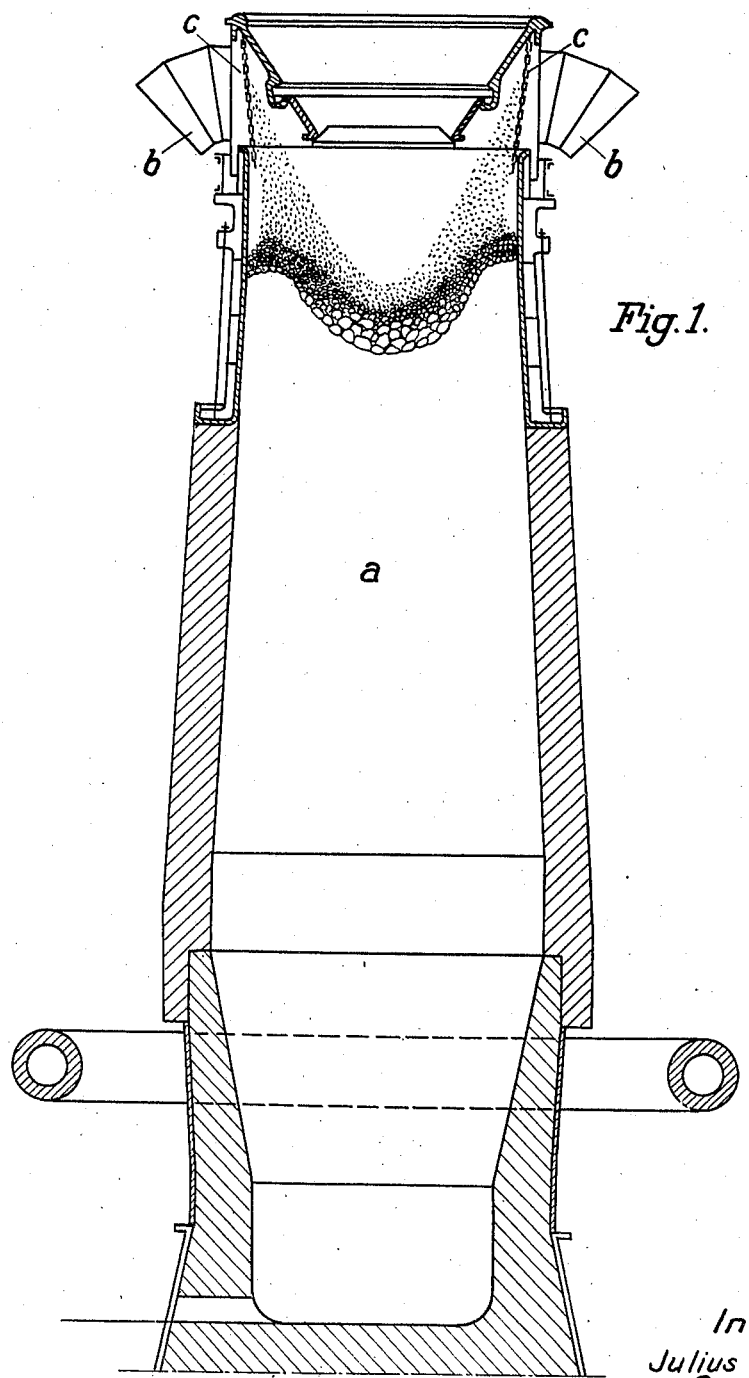

Jan. 7, 1930.   J. STOECKER   1,742,733
DEVICE FOR RETAINING THE FLUE DUST IN BLAST FURNACES
Filed Feb. 8, 1929   2 Sheets-Sheet 2

Inventor:
Julius Stoecker
by
Attorney

Patented Jan. 7, 1930

1,742,733

UNITED STATES PATENT OFFICE

JULIUS STOECKER, OF BOCHUM, GERMANY

DEVICE FOR RETAINING THE FLUE DUST IN BLAST FURNACES

Application filed February 8, 1929, Serial No. 338,486, and in Germany October 10, 1927.

In the blast furnace practice undesirable losses are sustained by the fact that a relatively large proportion of the blast furnace charge is being entrained by the gas current into the gas mains so as to render their treatment in the blast furnace impossible. This entrained material is recovered to a very large extent in the dust-catchers which are mounted in the gas mains. After the material has been properly prepared by clinkering or briquetting, it is again charged into the furnace. The quantity of the entrained flue dust depends upon the nature of the charge and upon the velocity of the gas in the shaft of the furnace and amounts to 10% of the blast furnace charge. The manufacturing costs of pig iron are increased to a considerable extent by these flue dust losses. It has already been proposed to overcome the said difficulty by passing the gases through the holes of a cast iron ring-shaped screen. Yet, this method did not prove a success and was accompanied by new difficulties. When the holes are so small as to retain a fair amount of flue dust they will be blocked within a short period of time. Besides, the rigidity of these screens is liable to cause danger. In connection with the explosions that are unavoidable in blast furnace operations very large amounts of choking gases are formed which cannot escape through the relatively small holes of the rigid screen, thus causing a dangerous increase in the pressure in the blast furnace. When, on the other hand, the holes in the screen are too large, they will not retain a sufficient amount of flue dust.

According to the invention all these drawbacks are overcome by providing a movable screen. Particularly satisfactory results have been obtained by a filter composed of chains. As a consequence of the free movement of both, the links of the chain as well as the chains in their entirety, the filter cannot be blocked. On the contrary, a filtering action is being obtained as a result of which only the fines, i. e. the zinc and lead vapors will escape from the furnace. In the case of an explosion the freely suspended chains give way, thus allowing the pressure to pass unobstructedly into the gas mains and to escape through the safety appliances provided for the purpose. As soon as the excess of pressure ceases the chains return into their original position. In order to be able to shake the chain filter for the purpose of cleaning it when the gases pass through in a perfectly quiet current, a special shaking device is provided. The movable filter may be disposed either before the gas outlets or, in order to obtain a free passage of the greatest possible diameter, it may be given a cylindrical form.

Figure 2:
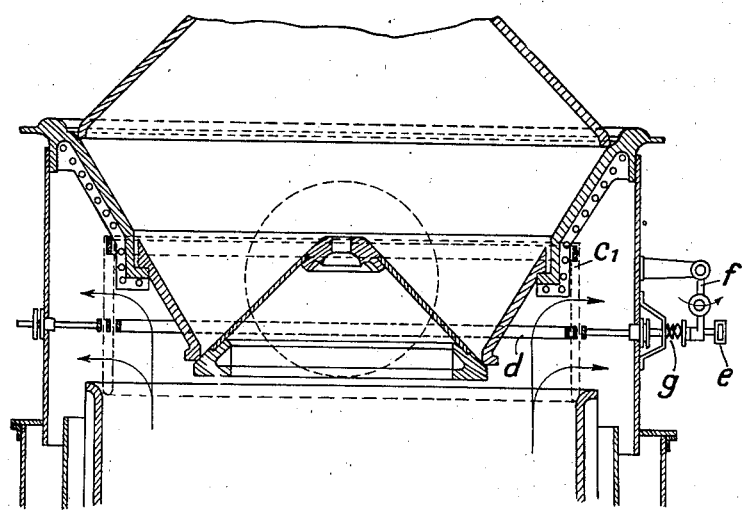

The annexed drawing shows a diagrammatic view of the invention. Fig. 1 is a sectional view of a blast furnace having the chain-filter disposed before the gas outlets, Fig. 2 shows a chain filter of cylnidrical shape provided with a shaking device. The gas current rising in the furnace $a$, before entering the gas outlets $b$, passes through a screen $c, c$ which consists of freely suspended chain links. According to Fig. 2 the chain-filter is of cylindrical shape. At about the middle of the screen a flat iron ring is provided which is connected to a shaking device $e$ outside the furnace in such a manner as to allow the filter to be shaked manually. Besides, means are provided to shake the screen through a lever $f$ in a mechanical way. A spring $g$ returns the shaking device into its original position.

Having thus described the invention, what is claimed as new, is:

1. In a blast furnace having an outlet for flue gases, a filter in said outlet comprising a freely movable sieve.

2. In a blast furnace having an outlet for flue gases, a filter in said outlet comprising a plurality of freely swinging chains.

3. In a blast furnace having an outlet for flue gases, a filter in said outlet comprising a plurality of freely swinging members having apertures therethrough to permit the passage of flue gases, said members being arranged in the form of a cylinder.

4. In a blast furnace having an outlet for flue gases, a filter in said outlet comprising freely movable means for intercepting flue dust, said means having apertures therethrough to permit the passage of flue gas, and means for shaking said filter from the outside of the furnace.

JULIUS STOECKER.